United States Patent [19]

Shnitkin et al.

[11] 3,836,973
[45] Sept. 17, 1974

[54] POLARIMETER APPARATUS

[75] Inventors: Harold Shnitkin, Roslyn; Albert Tashjian, Islip; Edward J. Shubel, Plainview, all of N.Y.

[73] Assignee: Maxson Electronics Corporation, Great River, N.Y.

[22] Filed: Sept. 29, 1972

[21] Appl. No.: 293,443

[52] U.S. Cl. ...................... 343/113 R, 343/100 PE
[51] Int. Cl. ............................................. G01s 5/02
[58] Field of Search .................. 343/113 R, 100 PE

[56] References Cited
UNITED STATES PATENTS

| 3,523,294 | 8/1970 | Okamura et al. | 343/100 PE |
| 3,540,045 | 11/1970 | Taylor | 343/100 PE |

*Primary Examiner*—Maynard R. Wilbur
*Assistant Examiner*—S. C. Buczinski
*Attorney, Agent, or Firm*—Bernard Malina

[57] ABSTRACT

An antenna and receiver system measures the polarization characteristics of an incident radio frequency signal. The system employs a signal processor for generating digital output signals indicating the angular orientation of the electric field vector of the arriving wave for a linearly polarized wave, or the degree of ellipticity and the orientation of the major axis for elliptically polarized incident waves. The signal processing is accomplished by means of a signal adder, six channels of log IF amplification and three video difference amplifiers.

8 Claims, 8 Drawing Figures

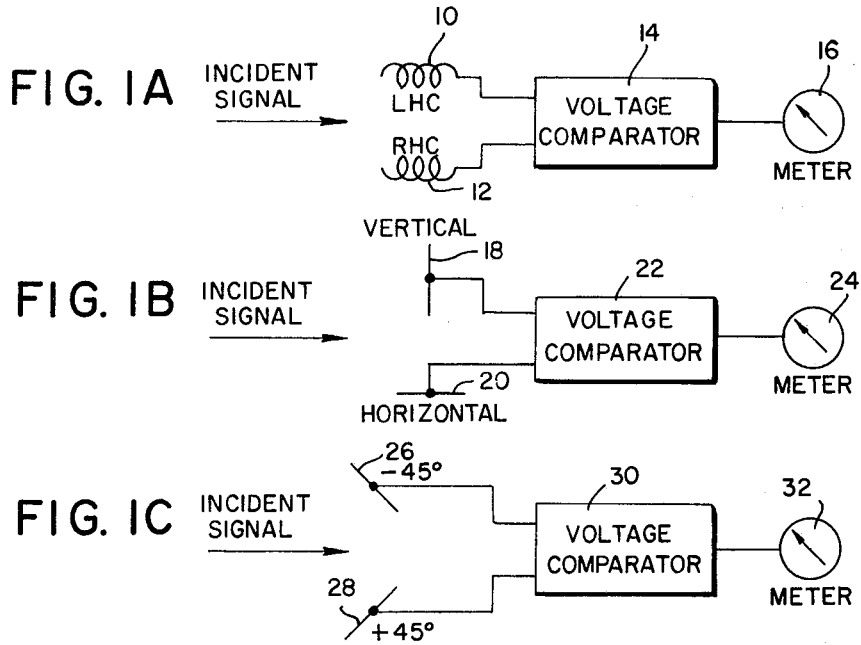
FIG. IA
FIG. IB
FIG. IC
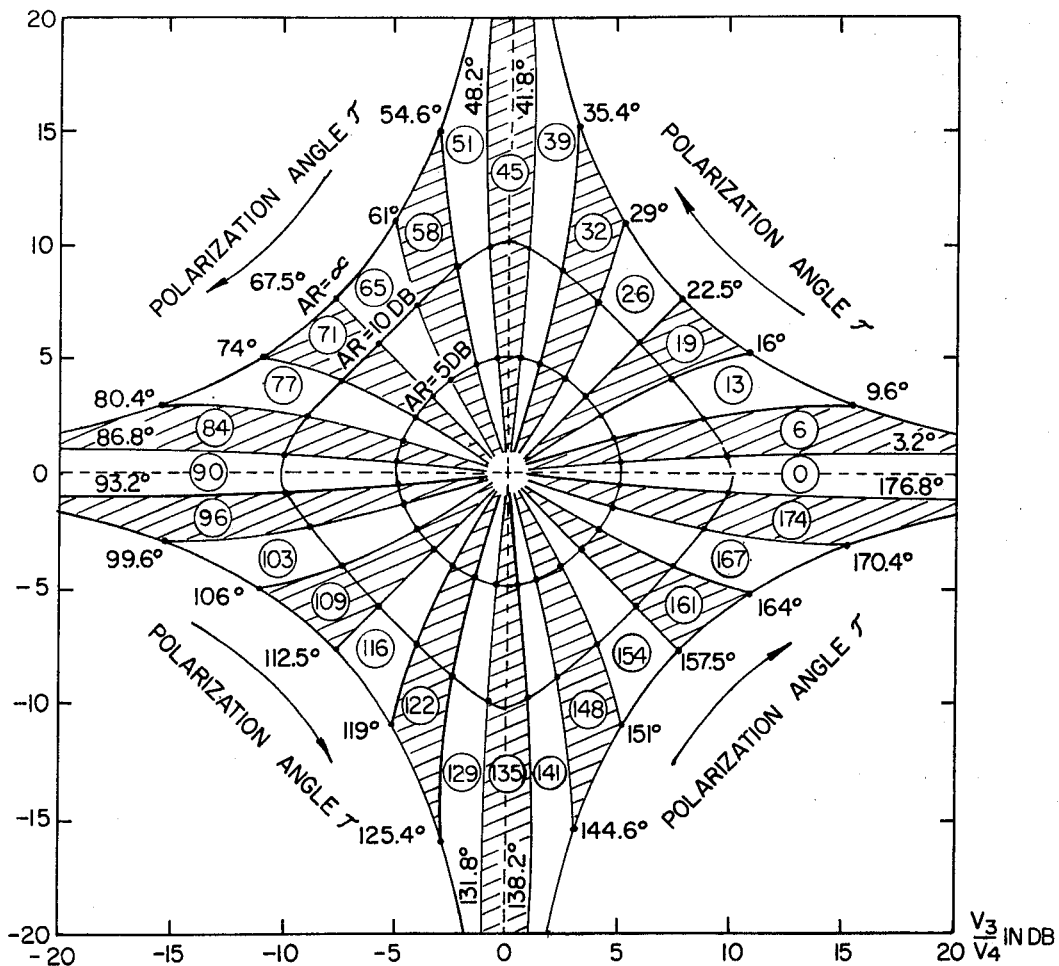
FIG. 4

POLARIMETER APPARATUS

BACKGROUND OF THE INVENTION

The present invention relates to electromagnetic antenna and receiver systems and more particularly to a polarimeter which performs polarization analysis and direction finding of electromagnetic energy emitters over a broad range of frequencies.

Under conditions of warfare, in hostile territory, the electromagnetic environment has become increasingly complex. The need for a polarization apparatus suitable for airborne operation as well as ground operation and which is capable of instantaneously analyzing the polarization characteristics of an electromagnetic emitter has correspondingly become most important. Such desired polarimeter apparatus should be capable of instantaneous accurate measurements of emitter characteristics and their locations in real time to facilitate optimization of emitter separation. To accomplish the foregoing tasks, the polarimeter should be able to measure ellipticity ratio, sense of rotation and orientation angle of the electric field vector of linear and elliptically-polarized waves from a sample of impinging radio frequency energy as short as 0.1 $\mu$sec. irrespective of whether such impinging RF energy constitutes a single pulse, a fraction of a pulse or CW emission.

It is therefore an object of the present invention to provide a polarimeter apparatus operative to perform polarization analysis and direction finding of radio frequency emitters over a broad range of frequencies.

It is a further object of the present invention to provide a polarimeter apparatus operative to generate digital output signals indicating the angular orientation of the electric field vector of the arriving wave for a linearly polarized wave, or the degree of ellipticity and the orientation of the major axis for elliptically polarized incident waves.

It is another object of the present invention to provide a polarimeter apparatus which is operative to render continuous real time measurement of polarization parameter variations.

It is yet a further object of the present invention to provide a polarimeter apparatus which is operative to simultaneously measure axial ratio, sense of rotation and axial ratio of an R.F. incident wave from a sample thereof as short as 0.1 $\mu$second, irrespective of whether such impinging R.F. energy constitutes a single pulse, a fraction of a pulse or CW emission.

It is yet another object of the present invention to provide a polarimeter apparatus in accordance with the foregoing objects which employs only two antennas.

SUMMARY OF THE INVENTION

In accordance with the principles of the present invention, there is provided a polarimeter apparatus for measuring the polarization characteristics of an incident electromagnetic wave comprising a vertically polarized antenna and a horizontally polarized antenna in orthogonal arrangement for respectively detecting the vertically polarized component and the horizontally polarized component of the incident wave. Mixer means are connected to the outputs of the vertically polarized and horizontally polarized antennas to produce first and second voltage signals representing the vertically polarized and horizontally polarized components respectively. Signal adder means having its input connected to the mixer means output is operative to produce the first and second voltage signals and third, fourth, fifth and sixth voltage signals comprising respectively, the sums of the first voltage signal and the second voltage signal shifted in phase by first, second, third and fourth phase shift angles respectively. Signal processing means are provided which is operative to process the third and fourth voltage signals to thereby derive as a function thereof, the axial ration of the incident wave and to process the first, second, fifth and sixth voltage signals to thereby derive as a function thereof, the polarization angle and sense of rotation of the incident wave.

Further objects, features and advantages of this invention will become apparent from a consideration of the following description, the appended claims and the accompanying drawings in which:

BRIEF DESCRIPTION OF THE DRAWINGS

FIGS. 1A to 1C are schematic diagrams of antenna pairs of various orthogonal polarizations [and polarization angles] for describing the background and basic principles of the present invention;

FIG. 4 is a polarization angle conversion chart in accordance with the principles of the present invention;

DESCRIPTION OF THE INVENTION

Figure 2:
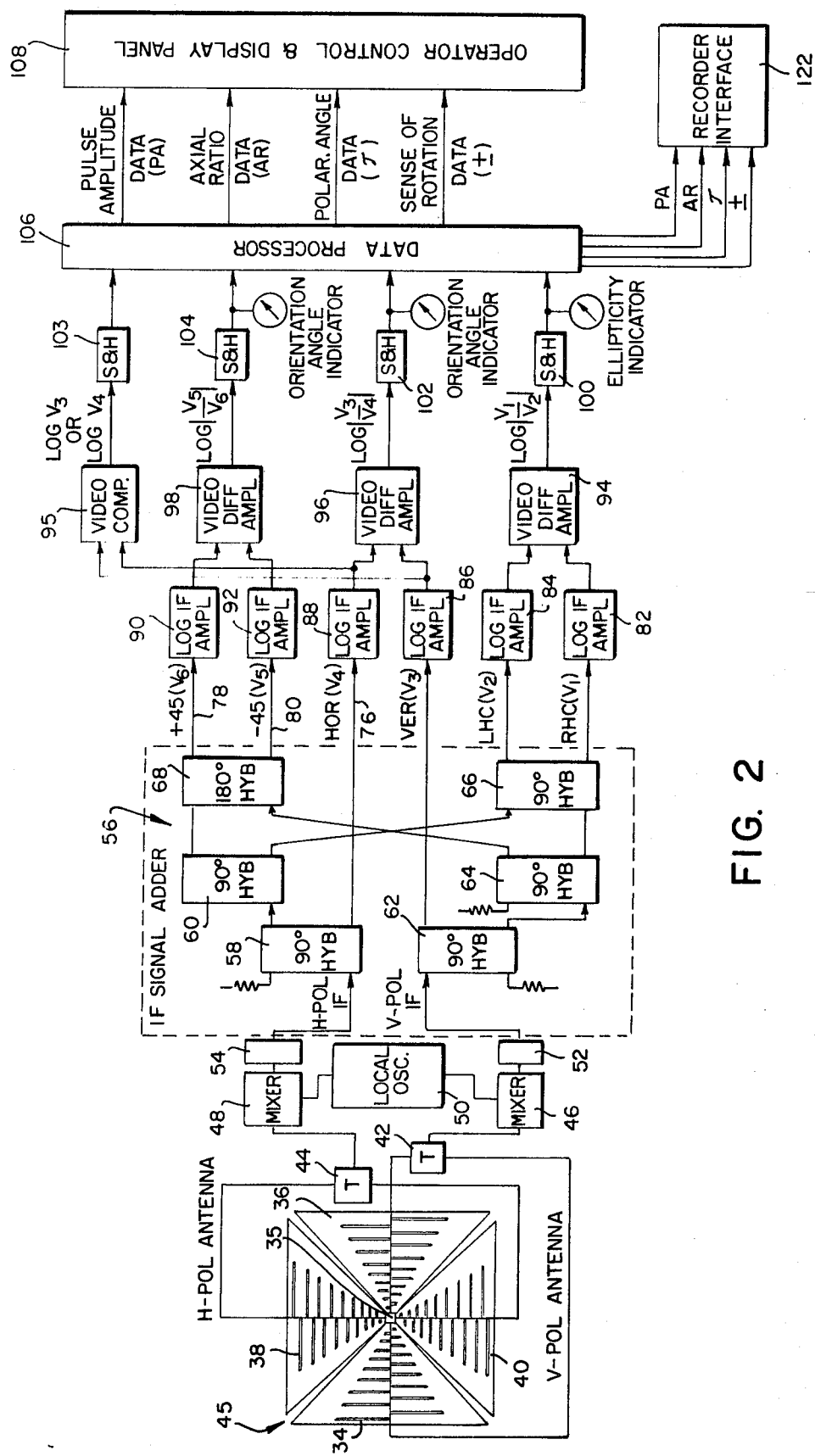
FIG. 2 is a functional block diagram of the polarization measurement and signal processor components of the polarimeter apparatus of the present invention.

The principles of operation of the present invention can be better understood by reference to FIGS. 1A–1C of the drawings in conjunction with the following discussion of the general principles of operation of the polarization analysis accomplished by the polarimeter of the present invention.

Any arbitrarily polarized electromagnetic wave can be characterized by the amplitude and phase of the vertical and horizontal components of its electric field. The measurement of these parameters can provide the data required for determination of ellipticity, sense of rotation and orientation of the electric field vector, provided that the vertical and horizontal components are received by orthogonal and phase-center-coincident antennas.

For purposes of illustrating the advantageous features of the present invention, and with reference to FIGS. 1A–1C, consider the array of three (3) pairs of antennas, of which antennas 10 and 12 are right-hand-circularly polarized (RHC) and left-hand-circularly polarized (LHC), respectively, and whose outputs are connected to a voltage comparator 14 which is connected at its output to a voltmeter 16. The sense of rotation of a polarized wave refers to the direction of rotation of the electric vector in a reference plan perpendicular to the direction of propagation. Thus, the sense rotation is right-handed if the electric vector rotates clockwise as the wave recedes from an observer and left-handed if the electric vector rotates counterclockwise. When the voltage outputs of antennas 10 and 12 are compared, i.e., logged and subtracted by voltage comparator 14, the result is equivalent to ellipticity. Thus, a left-circularly polarized wave which is incident to both antennas 10 and 12 will produce a maximum output from left-circularly polarized antenna 10 and a virtually zero output from right-circularly polarized antenna 12. Thus the difference between the two antennas 10 and 12 as measured by comparator 14 and as displayed by meter 16 would be a maximum negative value. Similarly, a right-circularly polarized wave incident on both antennas 10 and 12 will produce a maximum position reading on meter 16.

An elliptically polarized wave is one in which the rotating electric field vector defines an ellipse in a plane perpendicular to the direction of propagation. The axial ratio of such a wave is the ratio of the major to the minor axis of such an ellipse. Thus, a circularly polarized wave would have a minimum axial ratio while a linearly polarized wave would have a maximum axial ratio, while an elliptically polarized wave would have axial ratios falling between the above minimum and maximum values.

Thus, a linearly polarized wave incident thereon produces equal voltages on antennas 10 and 12 and hence meter 16 would show a zero reading. Accordingly, as the polarization of the incident wave varies from linear, through left-elliptical, to left-circular polarization representing a decreasing axial ratio, meter 16 would correspondingly vary from zero to a maximum negative value. Similarly, as the polarization varied from right-circular through right-elliptical to linear polarization, meter 16 would correspondingly vary from a maximum positive reading to zero.

From the foregoing, it is evident that by employing left-circularly polarized antenna 10 and right-circularly polarized antenna 12 both the ellipticity, i.e., axial ratio, and the sense of rotation can be determined.

In addition to ellipticity, i.e., axial ratio, and sense of rotations, the third parameter which characterizes a polarized electromagnetic wave propagating in free space is polarization angle, which refers to the angle between the major axis of the ellipse in the plane perpendicular to the direction of propagation and a reference line in space. The polarization angle can be determined unambiguously by means of the antenna arrangements shown in FIGS. 1B and 1C as follows:

In FIG. 1B a first antenna pair comprises a vertically polarized antenna 18 and a horizontally polarized antenna 20 connected to a voltage comparator 22 whose output is connected to a voltmeter 24. In FIG. 1C, a second antenna pair comprises linearly polarized antennas 26 and 28 which are oriented at −45° and 45° respectively. If an electromagnetic wave incident on antennas 18 and 20 is polarized at 45°, equal voltage signals will be produced and the reading on voltmeter 24 will be zero. If the incident wave is polarized at 90°, the entire magnitude of the incident wave will be received by vertical antenna 18 (horizontal antenna 20 receiving no signal) and the output of comparator 22 will be at its maximum positive value. Conversely, if the incident wave is polarized at 0°, the entire magnitude of the incident wave is received by horizontal antenna 20 and, accordingly, the reading of meter 24 will be at its maximum negative value.

For variation in the polarization angle in the incoming wave between 0° and 90° no ambiguities are presented since meter 24 will read more positive as the polarization angle increases from 45° to 90°, which variation from 45° to 0° will produce an increasingly negative reading. However, as the polarization angle increases from 90° to 180°, the reading on meter 24 will become decreasingly positive reaching zero at 135° and thereafter becoming increasingly negative reaching a maximum negative value at 180°, thus retracing the 0°–90° meter readings. It is noted that polarization of 180° to 270° will produce meter readings identical to polarizations 0° to 90°, and polarizations of 270°–360° will produce meter readings identical to polarization of 90°–180°.

Antennas 26 and 28 which are linearly polarized and oriented at −45° and 45° respectively, have the outputs connected to a voltage comparator 30, which, in turn is connected to a voltmeter 32. When the amplitudes of the signals received by antennas 26 are subtracted from the signal received by antenna 28 in comparator 30, it is seen that a maximum negative reading is obtained for the case of a −45° polarized incident wave and a maximum positive reading is obtained for a 45° polarized incident wave. Thus, meter 32 will read zero when a horizontally polarized wave is received and will read positive values for polarization from 0° to 45°, and then from a maximum positive value to zero for incident waves with polarization values from 45° to 90°. Similarly meter 32 will have negative readings for polarizations from 90° to 180°. It is therefore evident that the provision of antennas 10, 12 18, 20, 26 and 28 for each band of interest, and assuming that these antennas are steerable, have a common boresight and centers that are phase-coincident, the polarization angle can be determined unambiguously.

An important feature of the polarization apparatus of the present invention is the requirement of only a single pair of orthogonal antennas in lieu of the six antennas 10, 12, 18, 20, 26 and 28 described above. Thus, in accordance with the principles of the present invention, the six output voltages representing the right circular and left circular polarization antenna voltages, the vertical and horizontal polarization antenna voltages and the −45° and 45° degree polarization antenna voltages are derived by suitable processing of the input signal representing the incident wave. Referring to FIG. 2, which is a simplified functional block diagram of the polarization apparatus of the present invention, the otherwise complex and difficult task of phase measurement inherent in prior art polarimeter systems is replaced by a relatively simple and accurate IF amplitude comparison process in the following manner.

As suggested above, any arbitrarily polarized ratio wave can be characterized by the magnitude and electrical phase of the vertical and horizontal components of its electric field. Measurement of both the magnitude and phase of these two electric field components yields sufficient information for computation of axial ratio, sense of rotation and orientation of the electric field vector, provided that these electric field components are received by orthogonal and phase-center-coincident antennas.

Phase measurement is accomplished by two simple amplitude measurements of the voltage ratios produced by the passive combination of the vertically polarized component of the electric field, hereinafter referred to as $V_3$, and the horizontally polarized component of the electric field, hereinafter referred to as $V_4$. Thus, four voltages $V_1$, $V_2$, $V_5$ and $V_6$ are formed, each representing a different effective antenna polarization as follows:

$V_1 = V_3 + V_4 \; /90°$ representing right-hand circular polarization, $V_2 = V_3 + V_4 \; /-90°$ representing left-handed circular polarization, $V_5 = V_3 + V_4 \; /0°$ representing +45° linear polarization, $V_6 = V_3 + V_4 \; /180°$ representing −45° linear polarization.

The polarization information is derived by measuring the voltage ratios of adjacent pairs of voltages, i.e., $V_1/V_2$, $V_3/V_4$ and $V_5/V_6$.

Figure 3:
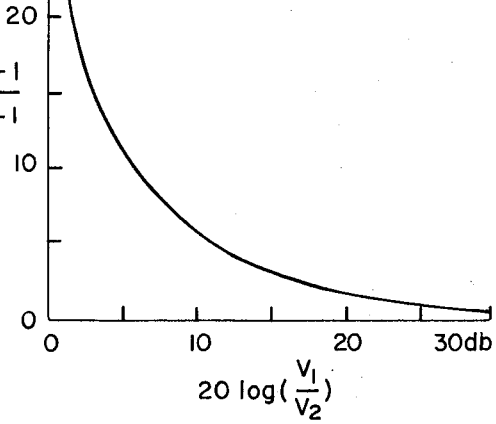
FIG. 3 is an axial ratio conversion chart in accordance with the principles of the present invention.

The determination of the axial ratio requires a determination of the maximum electric field vector to the minimum electric field vector, irrespective of the orientation angles at which they occur. Thus, the sum of the two measured counterrotating, constant amplitude, circularly polarized electric fields, i.e., $V_1$ and $V_2$, will be a maximum value of $V_1 + V_2$ when $V_1$ and $V_2$ are codirected and will be a minimum value of $V_1 - V_2$ when they are oppositely directed. Accordingly, the axial ratio (AR) can be expressed as the ratio of $V_1 + V_2$ to $V_1 - V_2$ or may be plotted on a logarithmic scale, as shown in FIG. 3 as $$AR = 20 \log [(V_1/V_2) + 1 \;/(V_1/V_2) - 1 \;] \tag{1}$$

The polarization angle, $\tau$, as referenced to the horizontal direction can be expressed as a function of $V_3/V_4$ $V_5/V_6$ as follows:

$$\tau = 1/2 \arctan [(V_3/V_4)^2 + 1 \;/(V_3/V_4)^2 - 1 \cdot (V_5/V_6)^2 - 1 \;/(V_5/V_6)^2 + 1 \;] \tag{2}$$

Equation 2 is graphed in FIG. 4, yielding quasi-radial lines of constant $\tau$ from 0 to 180 degrees on a coordinate system of $V_3/V_4$ and $V_5/V_6$, expressed in decibels. In addition, contours of linear polarization ($AR = \infty$), 5-db axial ratio, and 10-db axial ratio are also shown. The center of the chart in FIG. 4 represents a perfectly circular polarization. Equation (2) permits evaluation of $\tau$ over a range of 90°. To obtain a determination of $\tau$ over a maximum total of 180°, the ambiguity of the tangent function must be resolved by means of the magnitude of $V_5/V_6$. Thus, if $V_5/V_6$ is greater than unity, the +45°— directed component exceeds the −45° component and therefore $\tau$ is in the first quadrant; if it is less than unity, $\tau$ is in the second quadrant. The chart of FIG. 4 converts any values of $V_5/V_6$ and $V_3/V_4$ in db to polarization angle; only discrete values, separated by 6.4° are shown, requiring interpolation for better resolution. This chart also illustrates quantizing into 6.4° bins, centered at 0°, 6.4°, etc.

Figure 6:
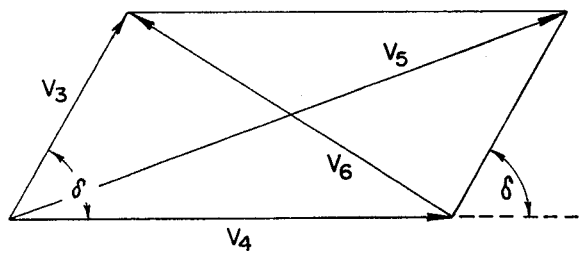
FIG. 6 is a vector diagram for derivation of $\tau$, the polarization angle of the major axis of elliptical polarization.

The derivation of equation (2) above may be obtained with reference to FIG. 6, where $\delta$ is the phase angle between $V_3$ and $V_4$. As set forth in the book by John D. Kraus entitled "Antennas," published by McGraw-Hill Book Co. (1950), at page 476, the polarization angle $\tau$ may be expressed as follows:

$$\tau = 1/2 \arctan (2V_3V_4 \cos \delta/V_3^2 - V_4^2) \tag{3}$$

Now under the Law of Cosines, $$V_6^2 = V_3^2 + V_4^2 - 2V_3V_4 \cos \delta \tag{4}$$

$$V_5^2 = V_3^2 + V_4^2 + 2V_3V_4 \cos \delta \tag{5}$$

Dividing the difference between (4) and (5) by the sum of (4) and (5) and cross multiplying, we obtain $$2V_3V_4 \cos \delta = (V_3^2 + V_4^2) \cdot (V_5^2 - V_6^2/V_5^2 + V_6^2) \tag{6}$$

Substituting equation (6) into equation (3) and rearranging the terms yields equation (2) above.

The system for performing polarization measurements is shown in functional block diagram form in FIG. 2. Four log-periodic dipole arrays 34, 36, 38 and 40 are arranged in symmetrical pyramid form. The two vertical dipole arrays 34 and 36 are connected through a symmetrical matched coaxial tee-junction 42 to form a vertically polarized broadband antenna 34-36 with its phase center on the axis 35 of the pyramid. The horizontal dipole arrays 38 and 40 are orthogonally arranged with respect to vertical arrays 34 and 36 and are similarly connected through a symmetrical matched coaxial teejunction 44, so that the phase centers of the two equipolarized array pairs 34-36 and 38-40 are translated onto the pyramid axis 35 for both vertical and horizontal polarization. The use of identical log-periodic array configurations for both the vertical and horizontal polarizations ensures that the phase centers of the two array pairs 34-36 and 38-40 are coincident. Thus, an equal-gain, equal-phase and phase-center-coincident dual polarized antenna assembly 45 is produced. Accordingly, irrespective of the polarization of the incident wave, only the complex value of the vertical E-field component will appear at the output of vertically polarized antenna junction 42 and only the complex value of the horizontal E-field component will appear at the output of horizontally polarized antenna junction 44.

The vertical and horizontal signals received by antenna pairs 34-36 and 38-40 are respectively applied to broad-band mixers 46 and 48 where they are mixed with equiphase local oscillator power provided by local oscillator 50, to generate IF signals at output leads 52 and 54 representing vertical and horizontal polarization respectively. Mixers 46 and 48 may advantageously constitute matched Schottky-barrier diode mixers because of their good broadband impedance tracking between the vertically polarized and horizontally polarized mixers. Furthermore, the local oscillator dividing circuit (not shown) in oscillator 50 and the mixer hybrids (not shown) in mixers 46 and 48 are symmetrically arranged to immunize phase and amplitude errors, to produce vertically and horizontally polarized IF signals whose relative amplitudes and phases correspond to those received by antenna pairs 34-36 and 38-40.

The vertical and horizontal IF signals are amplified in two phase and amplitude tracking, low-noise preamplifiers 52 and 54 with 20 db gain to achieve the required −60 dbm system sensitivity in view of the losses in the subsequent circuitry. Amplifiers 52 and 54 may also comprise a wide band-pass filter (not shown) with 80 db rejection outside the IF pass band to avoid interference by out-of-band signals.

The vertical and horizontal IF signals are applied to an IF signal adder 56 comprising 90° phase hybrids 60, 62, 64 and 66 and also 180° phase hybrid 68 where they are vectorially combined. Thus, addition by a ±90° phase hybrid produces a right-hand circular (RHC) and a left-hand circular (LHC) polarized signal port, respectively at outputs 70 and 72. Portions of the unmodified vertically polarized and horizontally polarized signals appear as $V_3$ and $V_4$ at outputs 74 and 76 of IF signal adder 56. A 180° hybrid 68 is operative to add the vertically polarized and horizontally polarized signals in phase generating a +45° linearly polarized port at output 78 and to add them out of phase generating a −45° linearly polarized port at output 80.

Each of the voltages $V_1$ through $V_6$ is amplified in separate matched pair log IF amplifiers 82, 84; 86, 88; and 90, 92 to generate six output signals, log $V_1$, log $V_2$ to log $V_6$. The outputs from each matched pair are compared in three differential amplifiers 94, 96 and 98. Differential amplifiers 94, 96 and 98 produce voltages proportional to log $V_1/V_2$ (i.e., log $V_1$ − log $V_2$), log $V_3/V_4$ and log $V_5/V_6$ which are stored in sample-and-hold circuits 100, 102 and 104 respectively. Additionally, the outputs of log IF amplifiers 86 and 88 are applied to video comparator 95 whose output is applied to sample-and-hold circuit 103 and to reference generator 99. Sample-and-hold circuits 100, 102, 104 and 103 may be interrogated by a reference video pulse from reference generator 99 with a variable delay to permit measurements through a 100 — nanosecond window anywhere within each RF pulse.

The three polarization parameters, i.e., axial ratio, polarization angle and sense of rotation may be computed manually by reference to the graphs in FIGS. 3 and 4. Thus, the ratio $V_1/V_2$ contains the axial ratio information for both linear and elliptical polarization and accordingly, whether the signal is linear, right-hand circular, left-hand circular, right-hand elliptically or left-hand elliptically polarized can be ascertained. The remaining two voltage ratios, i.e., $V_3/V_4$ and $V_5/V_6$ determine the value of polarization angle $\tau$ by reference to the graph of FIG. 4. Referring to FIG. 4, the quasi-radial lines of constant $\tau$ on a coordinate system of $V_3/V_4$ and $V_5/V_6$, expressed in decibels, define 6.4 degree wide bins, whose center angle value is shown by a circled number. Any combination of values of $V_3/V_4$ and $V_5/V_6$ in decibels falling within such a bin is interpreted as that bin's center angle value. By virtue of positive and negative db values, $\tau$ is shown to be unambiguous between 0° and 180°.

The data processor 106 is operative to convert the outputs of video amplifiers 94, 96 and 98 as provided by sample-and-hold circuits 100, 102 and 104 into binary data representing polarization parameters and pulse amplitude for operator display on panel 108, and recording on magnetic tape. Data processor 106 performs the required real-time computations and quantizing functions to produce eight values of axial ratio, 6.4° bins of polarization angle, $\tau$, 10-db bins of pulse amplitude, and a one-bit sense-of-rotation data.

Figure 5:
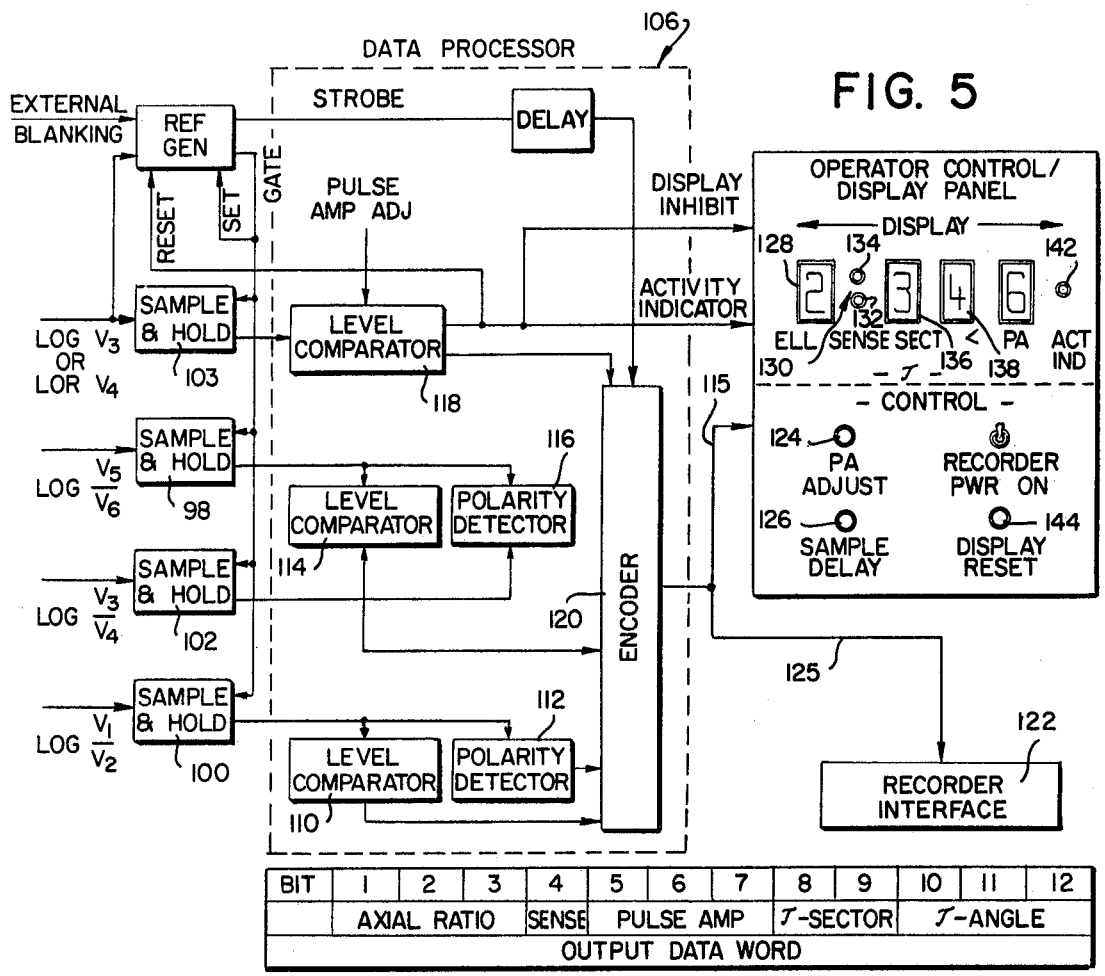
FIG. 5 is a functional block diagram of the data processor and operator control display panel of the polarimeter apparatus of the present invention.

Referring to FIG. 5, data processor 106 comprises level comparator 110 and polarity detector 112 connected to the output of sample-and-hold circuit 100, level comparator 114 and polarity detector 116 connected to the outputs of sample-and-hold circuits 104, and 102 respectively, and level comparator 118 connected to the output of sample-and-hold circuit 103. The outputs of level comparators 110, 114, 118 and polarity detectors 112 and 116 are fed into a binary encoder 120 which feeds its data to the output register and display panel 108 and to a recorder interface circuit 122.

Level comparator 110 quantizes the log $V_1/V_2$ voltage provided by sample-and-hold circuit 100 into eight bins which are then converted into binary form by encoder 120. Level comparator 114 which includes voltage divider circuits (not shown) is operative to quantize the ratio, i.e., slope, of 20 log $V_5/V_6$ relative to 20 log $V_3/V_4$ into eight bins which are also subsequently converted into binary form by encoder 120. Level comparator 118 provides pulse amplitude quantizing into eight bins which are likewise encoded by encoder 120. Polarity detectors 112 and 116 are operative to determine the sense of elliptical polarization as well as the appropriate 45° $\tau$-angle sector which information is applied to encoder 120 where it is encoded into binary form.

Operator control and display panel 108 comprises an upper display section and a lower control section as shown. Thus, the display section includes an ellipticity digital readout 128, a sense of rotation indicator 130 comprising two indicator lights 132 and 134 to indicate positive and negative senses respectively, the $\tau$ — angle sector digital readout 136, polarization angle readout 138, pulse amplitude readout 140, and an activity indicator light 142. The control section comprises a pulse amplitude adjust dial 124, a sample delay dial 126 and a display reset button 144.

Binary encoder 120 feed the final measured data by means of lead 115 to the output register and display panel 108 within 20 $\mu$seconds after occurence of the leading edge of the received RF pulse by antenna system 45. Versatility is provided in the system by virtue of the operator control over the minimum pulse amplitude of the displayed data by means of pulse amplitude adjust dial 124. The operator can also vary the time during which a particular data word is displayed by means of sample delay dial 126.

Binary encoder 120 may also feed the final measured data by means of lead 125 to the recorder interface circuits 122 which are operative to modify the stored data word into a form suitable for recording on magnetic tape of a magnetic tape recorder (not shown).

Although the invention has been described with reference to a particular embodiment thereof, it is to be understood that such embodiment is merely illustrative of the application of the principles of the invention. Numerous modifications may be made therein and other arrangements may be devised without departing from the spirit and scope of the invention.

What is claimed is:

1. Polarimeter apparatus for measuring instantaneously and continuously the polarization characteristics of an incident electromagnetic wave comprising a vertically polarized antenna and a horizontally polarized antenna in orthogonal arrangement for respectively detecting the vertically polarized component and the horizontally polarized component of said incident wave; mixer means connected to the outputs of said vertically polarized and horizontally polarized antennas to produce at its output first and second voltage signals representing said vertically polarized and horizontally polarized components respectively; signal adder means having its input connected to said mixer means output operative to simultaneously produce at its output, said first and second voltage signals, including third, fourth, fifth and sixth voltage signals comprising respectively the sums of said first voltage signal and said second voltage signal shifted in phase by first, second, third and fourth phase shift angles respectively; signal processing means operative to process said third and fourth voltage signals to thereby derive as a function thereof, the axial ratio of said incident wave and to simultaneously process said first, second, fifth and sixth voltage signals to thereby derive as a function thereof, the polarization angle and sense of rotation of said incident wave simultaneously with said derivation of said axial ratio.

2. Apparatus as defined in claim 1 wherein said vertically polarized antenna comprises two vertical log-periodic dipole arrays and said horizontally polarized antenna comprises two horizontal dipole arrays.

3. Apparatus as defined in claim 2 wherein said vertical and horizontal dipole arrays are arranged in a symmetrical pyramid form.

4. Apparatus as defined in claim 3 wherein said two vertical dipole arrays are connected through a symmetrical tee-junction to form said vertically polarized antenna with its phase center on the axis of said pyramid, and said two horizontal dipole arrays are connected through a symmetrical tee-junction to form said horizontally polarized antenna with its phase center coincident with that of said vertically polarized antenna.

5. Apparatus as defined in claim 1 wherein said first phase shift angle associated with said second voltage signal is $+90°$ representing right-handed circular polarization and said second phase shift angle associated with said second voltage signal is $-90°$ representing left-handed circular polarization.

6. Apparatus as defined in claim 1 wherein said third phase shift angle associated with said fifth voltage signal is $0°$ representing $+45°$ linear polarization and said fourth phase shift angle associated with said second voltage signal is $180°$ representing $-45°$ linear polarization.

7. Apparatus as defined in claim 5 wherein the axial ratio is derived by said signal processing means in accordance with the following relationship:

$$AR = 20 \log [(V_1/V_2) + 1 /(V_1/V_2) - 1]$$

where AR is the axial ratio, $V_1$ is said third voltage signal and $V_2$ is said fourth voltage signal.

8. Apparatus as defined in claim 6 wherein the polarization angle is derived by said signal processing means in accordance with the following relationship:

$$\tau = 1/2 \arctan [(V_3/V_4)^2 + 1/(V_3/V_4)^2 - 1 \cdot (V_5/V_6)^2 - 1/(V_5/V_6)^2 + 1]$$

where $\tau$ is the polarization angle, $V_3$ is said first voltage signal, $V_4$ is said second voltage signal, $V_5$ is said fifth voltage signal and $V_6$ is said sixth voltage signal.

* * * * *